(12) United States Patent
Hunter

(10) Patent No.: US 6,945,376 B1
(45) Date of Patent: Sep. 20, 2005

(54) FOOT OPERATED MOTORCYCLE CLUTCH

(76) Inventor: Robert M. Hunter, 3872 142nd Ave., Holland, MI (US) 49424

(*) Notice: Subject to any disclaimer, the term of this patent is extended or adjusted under 35 U.S.C. 154(b) by 0 days.

(21) Appl. No.: 10/633,912

(22) Filed: Aug. 4, 2003

(51) Int. Cl.[7] .............................................. F16D 23/12
(52) U.S. Cl. .................... 192/99 S; 74/529; 192/114 R
(58) Field of Search .......................... 192/99 S, 114 R; 74/539, 529, 535

(56) References Cited

U.S. PATENT DOCUMENTS

| | | | |
|---|---|---|---|
| 1,539,796 A * | 5/1925 | Kirst | 74/539 |
| 1,541,529 A * | 6/1925 | Saylor | 74/539 |
| 1,814,896 A * | 7/1931 | Chartier | 192/114 R |
| 2,028,198 A * | 1/1936 | Elliott | 192/114 R |
| 2,094,163 A | 9/1937 | Weber | 74/481 |
| 2,540,926 A | 2/1951 | Zook | 192/3.51 |
| 2,600,767 A * | 6/1952 | Herrell | 192/3.61 |
| 3,856,123 A | 12/1974 | Kinsey | 192/3.62 |
| 4,041,798 A | 8/1977 | Shinozaki et al. | 74/512 |
| 4,056,268 A | 11/1977 | Connor et al. | 273/118 R |
| 4,316,531 A | 2/1982 | Harpster | 192/114 R |
| 4,543,850 A | 10/1985 | Bednar et al. | 74/512 |
| 5,662,195 A | 9/1997 | Rush | 192/3.51 |
| 6,786,312 B1 * | 9/2004 | Osborne | 192/99 S |
| 2003/0222425 A1 * | 12/2003 | Dennert et al. | 280/291 |

* cited by examiner

Primary Examiner—Rodney H. Bonck
(74) Attorney, Agent, or Firm—Grace J. Fishel

(57) ABSTRACT

A mechanism to retrofit modern motorcycles with a foot operated clutch or to be installed as original equipment is disclosed. The mechanism has an escapement mechanism, such as a pawl and ratchet, for holding the clutch in disengaged condition when a rider applies positive pressure on a foot pedal without requiring the rider to hold the foot pedal down with his or her left foot. This frees the rider to balance the motorcycle. The mechanism then allows the clutch to be readily reengaged when the rider desires to move the motorcycle by applying further positive pressure to the foot pedal.

11 Claims, 6 Drawing Sheets

FOOT OPERATED MOTORCYCLE CLUTCH

BACKGROUND OF THE INVENTION

1. Field of the Invention

The present invention relates to a foot operated clutch for a motorcycle.

2. Brief Description of the Prior Art

Modern motorcycles are typically provided with mechanical clutches in the drive train. The clutches are manually operated by action of a hand lever which drives a cable connected to the clutch. Gear selection is obtained by operation of a foot lever. Older motorcycles, those made in the 1940's and before, were provided with clutches which were foot operated and with hand operated gear selection levers. Such motorcycles include older Harley-Davidson (TM), Moto Guzzi (TM) and Indian (TM) motorcycles, among others.

Recently, there has been a growing nostalgic attraction for older motorcycles. However, there is an insufficient number of such machines available to satisfy the demand for them. In addition, because of short supply, older and collectable motorcycles are very expensive. Consequently, it has become desirable to retrofit more modern motorcycles with foot operated clutches and with hand operated gear selection levers. The retrofitted motorcycles imitate the older designs and satisfy the nostalgic appeal of the antique machines.

U.S. Pat. Nos. 2,094,163, 2,540,926, 3,856,123, 4,041, 798, 4,056,268, 4,316,531, 4,543,850, and 5,662,195 are incorporated by reference herein.

BRIEF SUMMARY OF THE INVENTION

The device of the present invention is a foot operated clutch mechanism which may be installed as original equipment or used to retrofit an existing modern motorcycle. The device has structure that frees a rider from holding the clutch in disengaged condition.

A motorcycle is structured such that the foot brake is operated with a rider's right foot. When the motorcycle is stopped in traffic, for example at a stoplight, the rider applies the brake with the right foot and balances the motorcycle with the left foot. With a motorcycle gear selector, it is difficult to find the neutral position and it is therefore necessary to disengage the clutch. This creates a problem for a rider with a foot clutch because the left foot is needed to balance the motorcycle.

The present invention addresses the above-mentioned problem by providing an escapement mechanism, such as a pawl and ratchet, for holding the clutch in disengaged condition without requiring the rider to hold the clutch down with his or her left foot. This frees the rider to balance the motorcycle. The mechanism then allows the clutch to be readily reengaged when the rider desires to move the motorcycle.

It is thus an object of this invention to provide a foot operated clutch mechanism that can be used to retrofit existing hand clutch motorcycles or used as original equipment. Another object is to provide a foot operated clutch mechanism that selectively holds the clutch in disengaged condition and frees the rider to use his or her left foot to balance the motorcycle when needed. A further object is to provide a foot operated clutch mechanism that readily reengages the clutch and allows the rider to feather the clutch in an ordinary manner. Other objects and features of the invention will be in part apparent and in part pointed out hereinafter.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
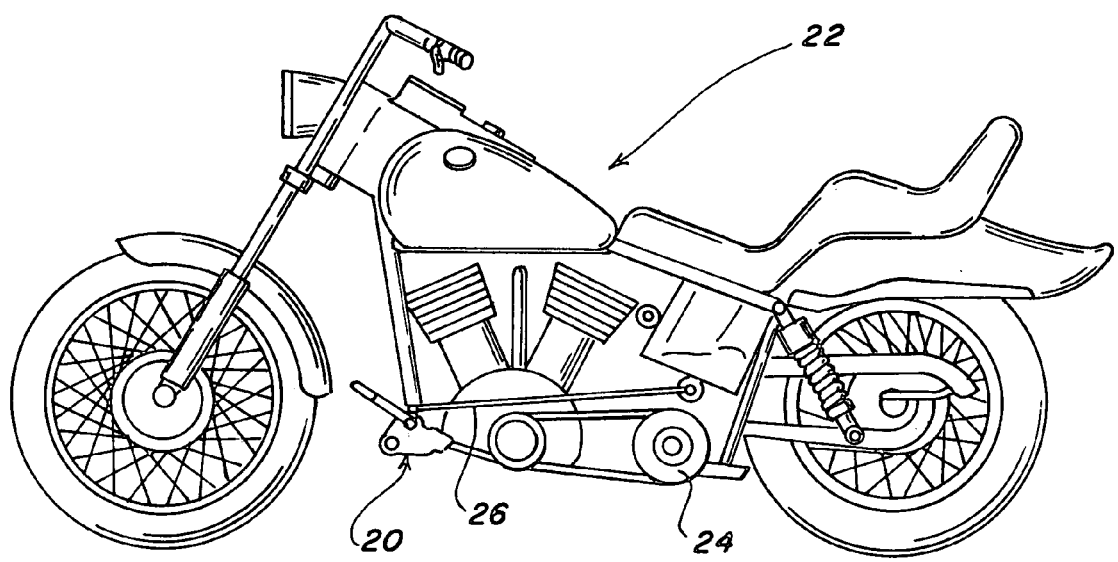
FIG. 1 is a left side view of the device of the invention installed on a motorcycle.
Figure 2:
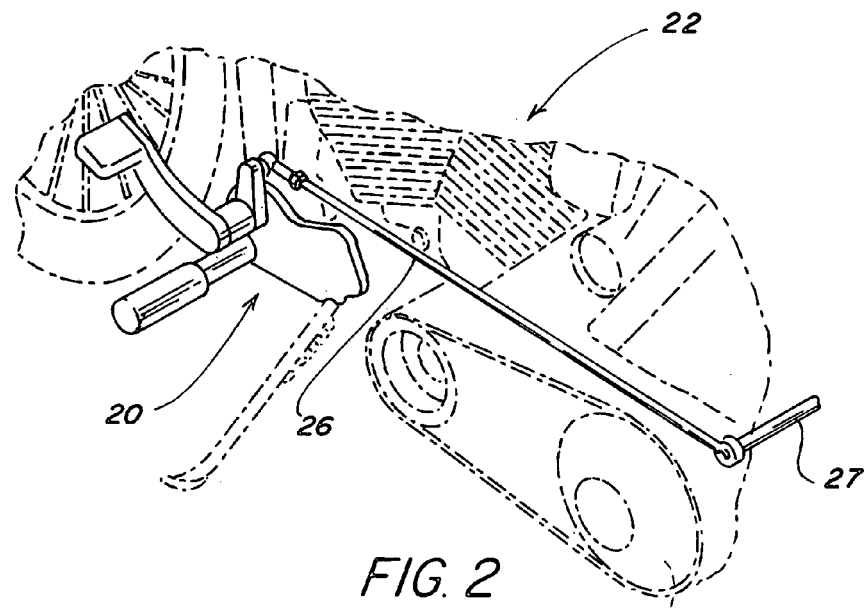
FIG. 2 is a partial perspective view of the device of the invention installed on a motorcycle, in phantom.

Referring to FIG. 1, a foot operated clutch mechanism 20 of the invention is shown installed on a conventional modern motorcycle 22. Foot operated clutch mechanism 20 activates a clutch 24 through a clutch activating rod or link 26 and a clutch lever 27. Foot operated clutch mechanism 20 includes a mounting plate 28 which is provided with a plurality of mounting holes 30 which accept mounting bolts to attach the foot operated clutch mechanism to the frame of motorcycle 22, as shown. Mounting plate 28 may also be equipped with a conventional foot rest 32.

Figure 3:
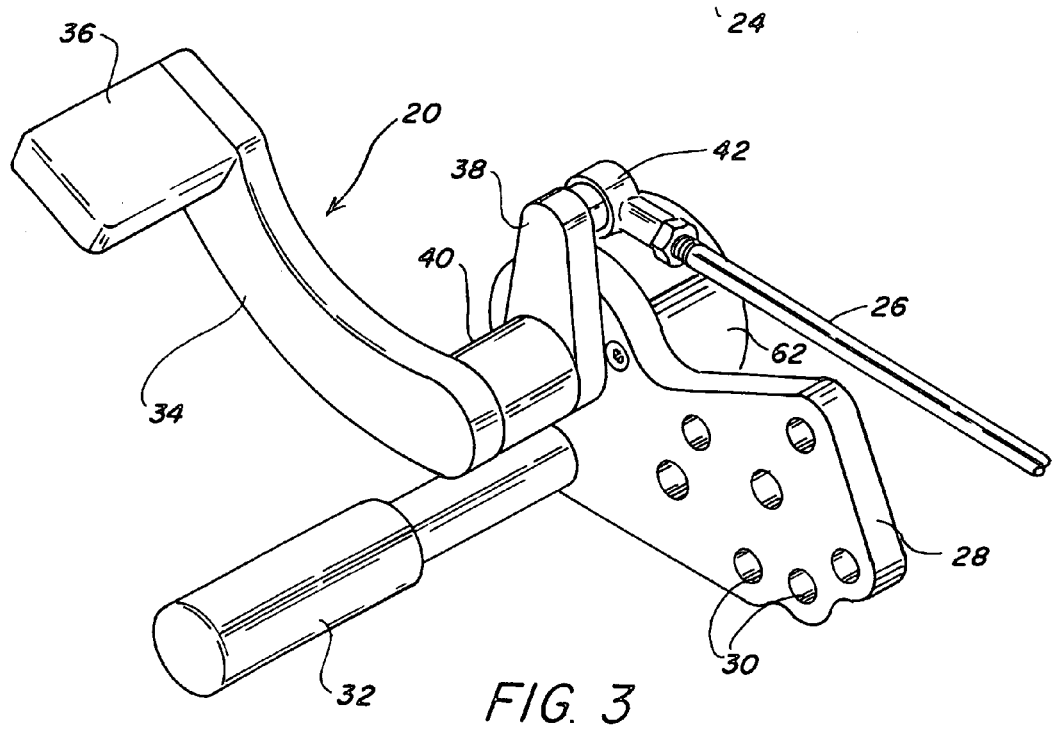
FIG. 3 is a perspective view of the device of the invention.

Foot operated clutch mechanism 20 is operated through a foot lever 34 and pedal 36 which drive a rod lever 38 through an intermediate member 40, as best seen in FIG. 3. It will be appreciated that foot lever 34, pedal 36, intermediate member 40 and rod lever 38 are joined to act as a unit without relative movement between these elements. Rod lever 38 drives clutch activating rod 26 through an adjustable tie rod end 42.

Figure 4:
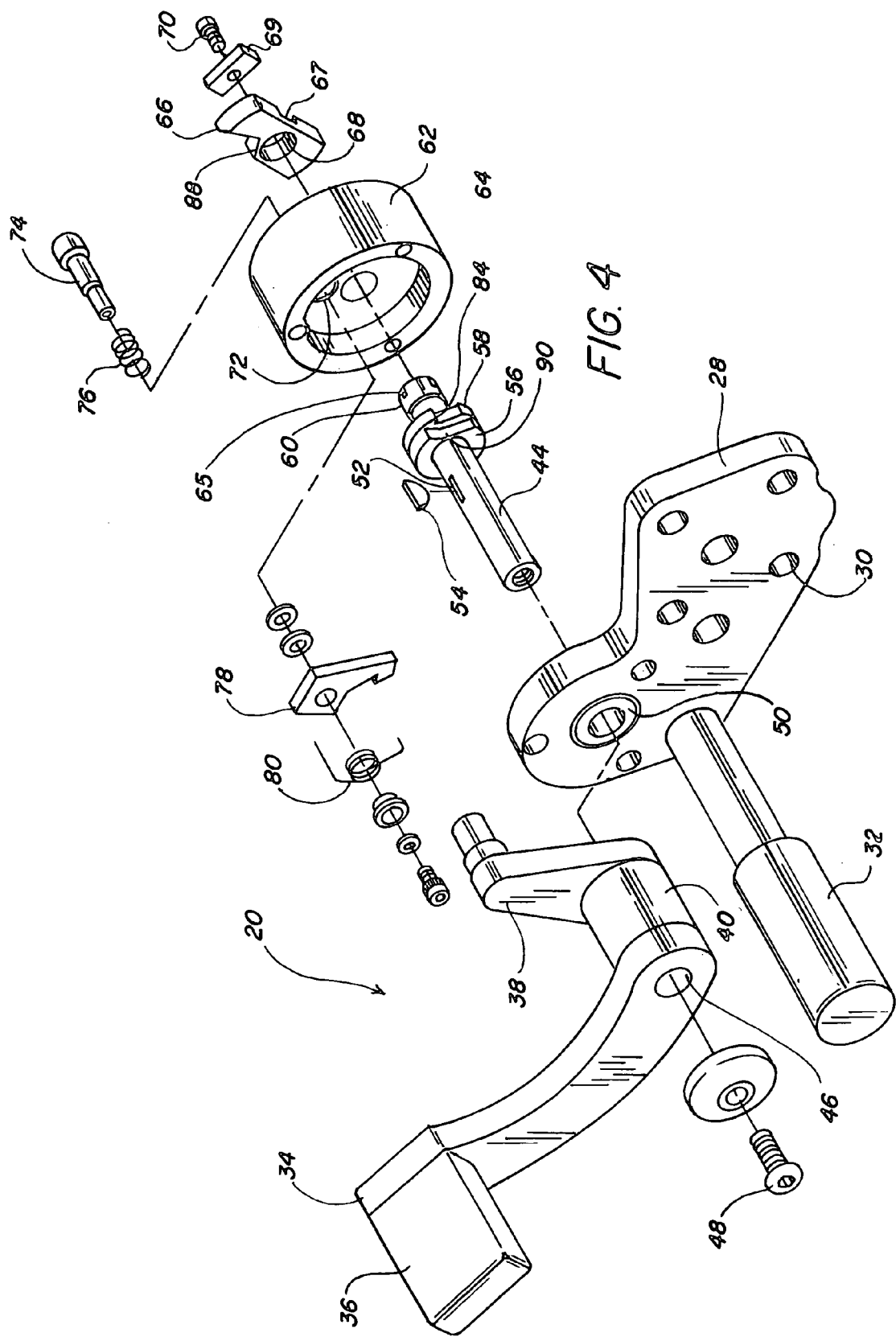
FIG. 4 is an exploded view of the device of the invention.

Turning to FIG. 4, the operating elements 34, 36, 38 and 40 receive a keyed shaft 44 in a bore 46. Operating elements 34, 36, 38 and 40 are fastened to keyed shaft 44 by use of suitable fasteners, such as a machine screw 48. Keyed shaft 44 is journaled in a bearing 50 in mounting plate 28 and extends transversely therethrough. When keyed shaft 44 is passed through bearing 50, a key way 52 with a drive key 54 is positioned on the same side as operating elements 34, 36, 38 and 40 with drive key 54 received in a drive slot (not shown) in the inner portion of bore 46 to complete a driving connection between operating elements 34, 36, 38 and 40 and keyed shaft 44. It will be appreciated that other equivalent structures may be used to fix shaft 44 to elements 34, 36, 38 and 40. For example, shaft 44 may be tapered and/or pressed into bore 46. Shaft 44 may also be splined or may have a square or other shape to mate with a similar shape in bore 46. Combinations of these structures may also be used.

Keyed shaft 44 has two ratchets 56 and 58 installed thereon by conventional means as described herein for the other structures on keyed shaft 44. When keyed shaft 44 is installed in bearing 50, ratchets 56 and 58 remain are on the opposite side of mounting plate 28. Keyed shaft 44 had a slotted end 60 which extends beyond ratchets 56 and 58, as shown. A housing 62 has a central bore 64 therein which receives slotted end 60 of keyed shaft 44 therethrough. As shown in FIG. 4, slotted end 60 of the keyed shaft 44 has a transverse slot 65 therein. Housing 62 may be attached to mounting plate 28, as shown in FIG. 3, by the use of suitable fasteners such as machine screws, not shown.

The right side of housing 62 contains a slotted cam 66. As shown in FIG. 4, slotted cam 66 has a transverse slot 67 therein. Slotted cam 66 has a bore 68 for receipt of slotted end 60 of keyed shaft 44. When slotted end 60 of keyed shaft 44 and slotted cam 66 are positioned with their slots, 61 and 67 in communication, they are joined by a keeper 69 held by a suitable fastener, such as a machine screw 70, as shown. It will be appreciated that other equivalent structures may be used to fix cam 66 to shaft 44. For example, shaft 44 may be tapered and/or pressed into cam 66. Shaft 44 may be splined or may have a square or other shape to mate with a similar shape in cam 66. Combinations of these structures may also be used.

Figure 5:
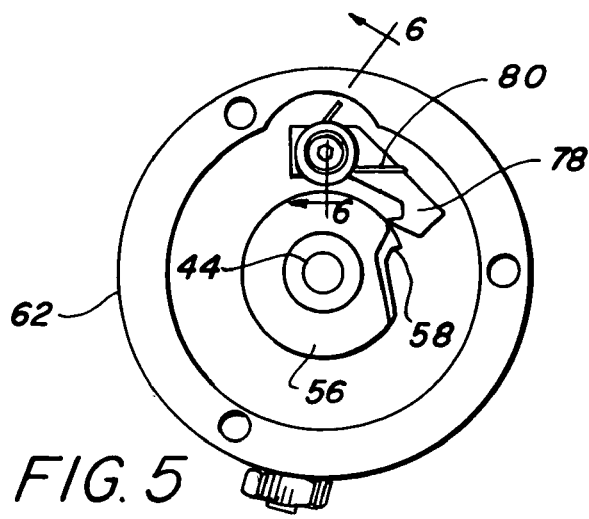
FIG. 5 is a front detail view of the device of the invention.
Figure 6:
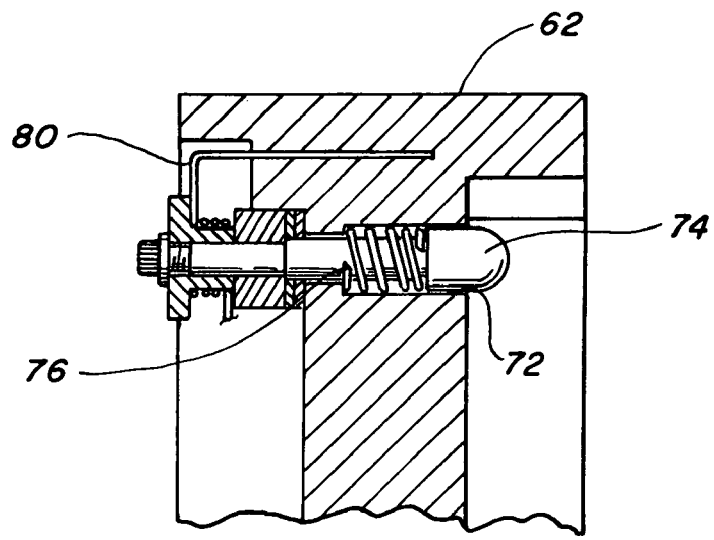
FIG. 6 is a partial cross-sectional view of the device of the invention taken along the plane 6—6 in FIG. 5.
Figure 7:
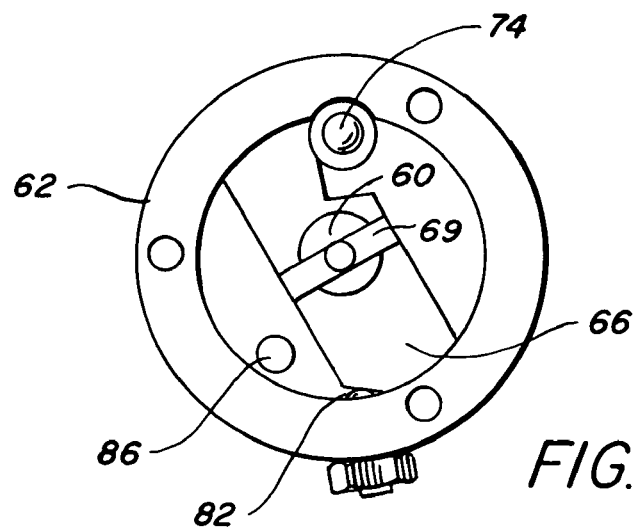
FIG. 7 is a back detail view of the device of the invention shown in FIG. 5.
Figure 10:
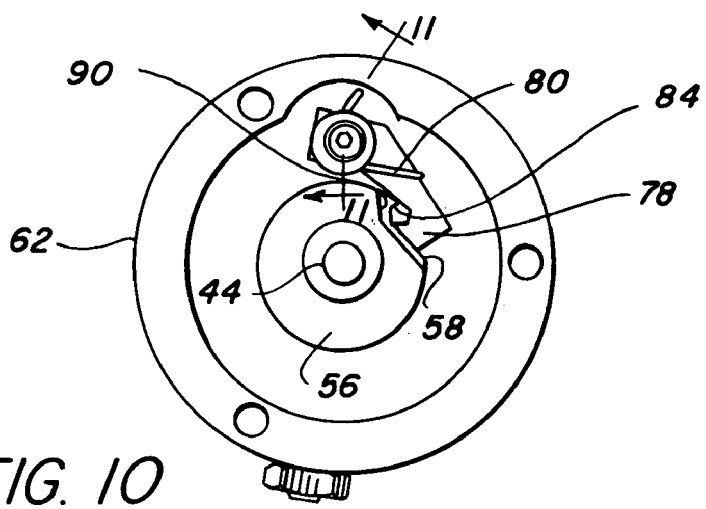
FIG. 10 is a front detail view of the device of the invention similar to FIGS. 5 and 8.
Figure 11:
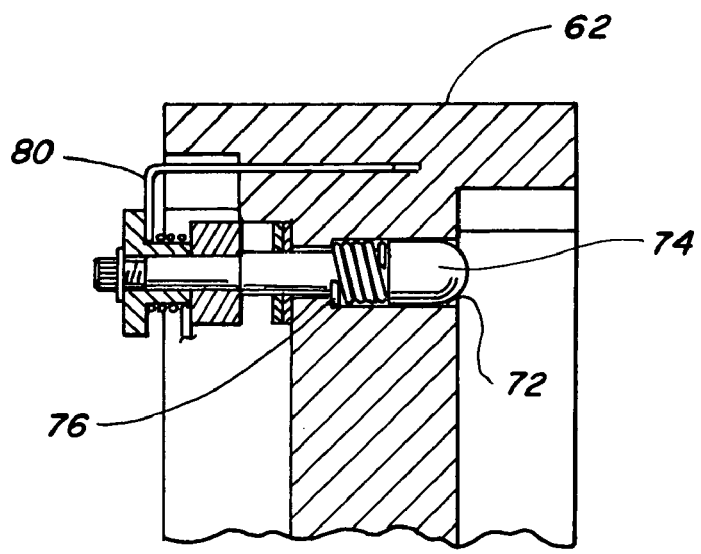
FIG. 11 is a partial cross-sectional view of the device of the invention taken along the plane 11—11 in FIG. 10; and, FIG. 12 is a back detail view of the device of the invention similar to FIGS. 7 and 9.
Figure 12:
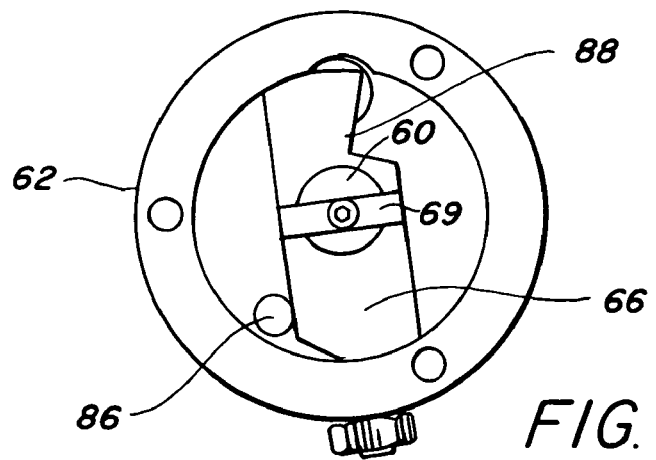

Housing 62 also has a peripheral bore 72 therethrough, as shown in FIGS. 6 and 11. A piston or plunger 74 is received in peripheral bore 72 and extends transversely therethrough to the right side of housing 62. As shown, bore 72 and piston 74 have circular cross-sections. It will be appreciated, however, that they may be constructed with non-circular cross-sections if desired. Piston 74 is biased to the right by a spring 76 which is captured in bore 72, as shown in FIG. 6. The left end of piston 74 extends through to the left side of housing 62, as shown in FIGS. 6 and 11. A pawl 78 is attached to the left end of piston 74, by conventional means as described herein, and is biased in the clockwise direction by a spring 80 anchored in the housing 62, as shown in FIGS. 5, 6 and 10. As shown in FIGS. 4, 6 and 11, pawl 78 may be secured to the left end of piston 74 by suitable spacers and fasteners. As shown in FIGS. 5, 7, 10, and 12, housing 62 may have a spring loaded detent 82 which engages cam 66, as described herein. Pawl 78, ratchets 56 and 58, and cam 66 provide an escapement mechanism for device 20, as described herein.

OPERATION OF THE DEVICE

To operate the device to disengage the clutch of a motorcycle on which the device of the invention is installed the rider rotates foot lever 34 in the counterclockwise direction by applying positive force to pedal 36 by use of the left foot. Intermediate member 40 and rod lever 38 also rotate in the counterclockwise direction and pull clutch activating rod 26 to the left as shown in FIG. 3. Clutch activating rod 26 disengages the clutch of the motorcycle when so moved by operating clutch lever 27. It will be appreciated that the modern hand lever and cable connection have been previously removed from clutch lever 27.

Figure 8:
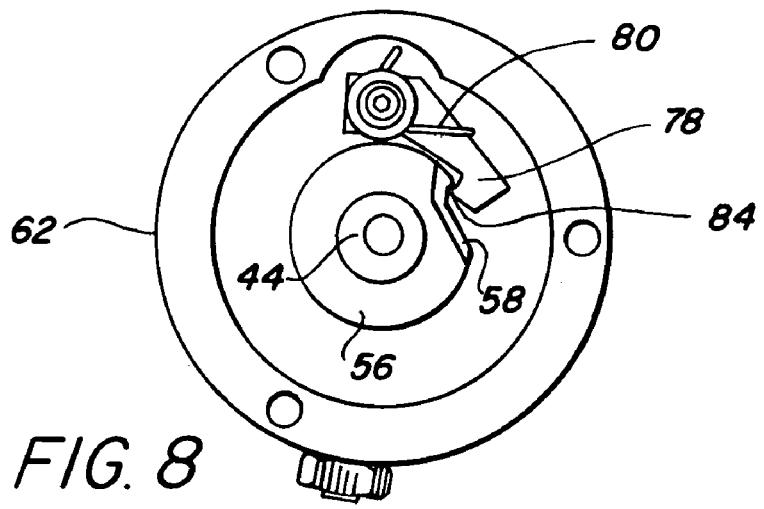
FIG. 8 is a front detail view of the device of the invention similar to FIG. 5.
Figure 9:
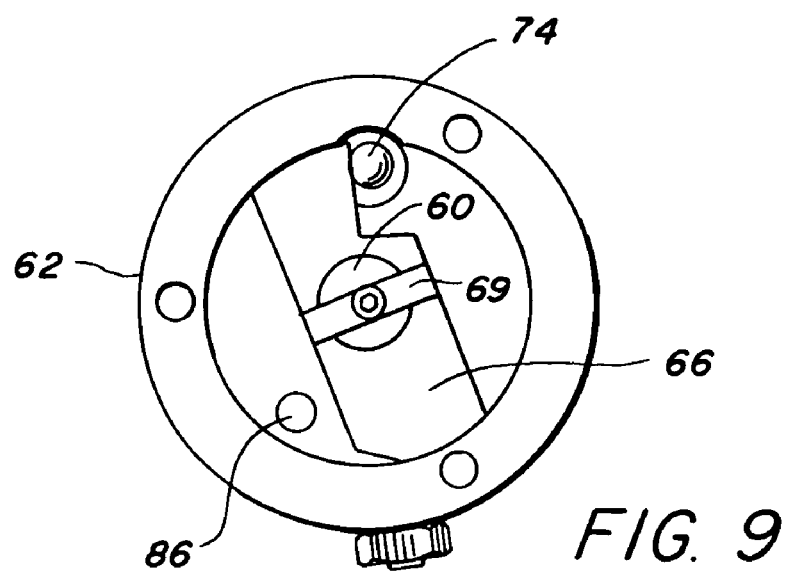
FIG. 9 is a back detail view of the device of the invention similar to FIG. 7.

As intermediate member 40 and rod lever 38 move in the counterclockwise direction they move keyed shaft 44 in the counterclockwise direction also. Ratchets 56 and 58 are joined to keyed shaft 44 and carried in a counterclockwise direction by keyed shaft 44. Ratchet 58 moves from the position shown in FIG. 5 to the position shown in FIG. 8. As shown, pawl 78 glides over the surface of ratchet 58 and engages a notch 84 in the ratchet 58. Cam 66, also joined to keyed shaft 44, moves from the position shown in FIG. 7 to the position shown in FIG. 9 and is held in that position by detent 82. As shown in FIG. 8, pawl 78 prevents keyed shaft 44 from rotating in a clockwise direction and fixes clutch activating rod 26 to hold motorcycle clutch lever 27 and clutch 24 latched in the disengaged position. The left foot of the rider is thus free to hold the motorcycle steady by resting on the road surface, for example when stopped at a stoplight, as device 20 maintains clutch 24 locked in the disengaged position.

To reengage motorcycle clutch 24 the rider applies additional positive force to foot pedal 36 to rotate mechanism 34, 40 and 38 an addition distance in the counterclockwise direction. This movement releases pawl 78 from ratchet 58 as keyed shaft 44 and ratchet 58 rotate in the counterclockwise direction from the position shown in FIG. 8 to the position shown in FIG. 10. Cam 66 is also rotated by keyed shaft 44 from the position shown in FIG. 9 to the position shown in FIG. 12 and is prevented by a stop 86 from further counterclockwise rotation. In this position, a cam surface 88 on cam 66 depresses piston 74 and moves it to the left, as shown in FIG. 11. In this position, pawl 78 is freed from engagement with ratchet 58 and glides over a relieved portion 90 on ratchet 56. The force of an internal spring (not shown) of motorcycle clutch 24 retracts clutch activating rod 26 and clutch 24 reengages. The engagement of clutch 24 can be feathered in the normal manner by maintaining some foot positive pressure on foot pedal 36 as clutch activating rod 26 is retracted by the internal spring of clutch 24. As clutch 24 reengages, cam 66 moves from the position shown in FIG. 12 to the position shown in FIG. 7. Spring 76 restores piston 74 to the position shown in FIG. 6 and device 20 is ready for a next cycle of use to disengage clutch 24.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A foot activated device for motorcycle clutches, the device having a foot pedal and a clutch activating link, the device having a shaft connecting the foot pedal to the clutch activating link, the device also having a pawl and ratchet escapement mounted on the shaft to selectively hold the device in a clutch disengaging position in response to foot pressure on the foot pedal and a cam that moves the pawl axially along the shaft to selectively disengage the pawl and ratchet escapement in response to further foot pressure on the foot pedal.

2. The device of claim 1 wherein the device may be returned to a clutch engaging position by release of foot pressure on the foot pedal.

3. The device of claim 1 wherein the pawl is mounted on a piston and wherein the piston is displaced by the cam to move the pawl out of cooperation with the shaft in response to foot pressure on the foot pedal.

4. The device of claim 3 wherein the device has a spring cooperating with the piston, the spring operating to return the piston to a position to reengage the ratchet on an additional cycle of use.

5. The device of claim 1 wherein the device may be retrofit to motorcycles provided with hand clutch mechanisms.

6. A foot operated clutch activating device for motorcycle clutches which may be retrofit to hand clutched motorcycles comprising a foot operated lever, the foot operated lever having a foot pedal, the device having a clutch activating link, the clutch activating link being connected to the foot operated lever by an intermediate lever, the foot operated lever and the intermediate lever being connected to a transverse shaft at a first end of the transverse shaft, the device having a shaft housing and having a second end of the transverse shaft received in the shaft housing, the shaft housing also having a pawl and ratchet escapement therein, the pawl and ratchet escapement mounted on the transverse shaft whereby the device may be latched in a clutch disengaging position on operation of the foot operated lever and a cam that moves the pawl axially along the shaft in response to further foot pressure on the foot operated lever.

7. The device of claim 6 wherein the device may be returned to a clutch engaging position by release of positive pressure on the foot pedal.

8. The device of claim 6 wherein the shaft housing has a transverse plunger mounted therein, the transverse plunger having the pawl mounted on a first end of the transverse plunger, the transverse plunger having a second end, the cam cooperating with the second end of the transverse plunger to move the plunger and move the pawl to unlatch the device.

9. The device of claim 8 wherein the transverse plunger has a return spring.

10. The device of claim 6 wherein the device has a mounting plate, the transverse shaft being mounted through the mounting plate.

11. A foot operated clutch activating device for motorcycle clutches for retrofitting hand clutched motorcycles comprising foot operated means for engaging and disengaging a motorcycle clutch, the device having means for mounting the device to a motorcycle, the foot operated means including pedal means mounted on a shaft responsive to positive foot pressure for disengaging a motorcycle clutch, the foot operated means further including a pawl and ratchet escapement mounted on the shaft for locking the device in a clutch disengaging position, the foot operated means also including means responsive to positive foot pressure on the pedal means for unlocking the device and returning the device to a clutch engaging position, whereby the clutch of a motorcycle may be selectively engaged and disengaged and may be held in a disengaged position without manual input from a motorcycle rider.

* * * * *